(12) United States Patent
Riisager et al.

(10) Patent No.: US 8,702,338 B2
(45) Date of Patent: Apr. 22, 2014

(54) SHRINK DISK CONNECTION FOR A WIND TURBINE (75) Inventors: Peter Albæk Riisager, Hadsten (DK); Niels Christian Olsen, Tjele (DK)

(73) Assignee: Vestas Wind Systems A/S, Aarhus N. (DK)

( * ) Notice: Subject to any disclaimer, the term of this patent is extended or adjusted under 35 U.S.C. 154(b) by 125 days.

(21) Appl. No.: 13/140,304

(22) PCT Filed: Dec. 15, 2009

(86) PCT No.: PCT/DK2009/050334
§ 371 (c)(1), (2), (4) Date: Aug. 4, 2011

(87) PCT Pub. No.: WO2010/069324
PCT Pub. Date: Jun. 24, 2010

(65) Prior Publication Data
US 2011/0293357 A1    Dec. 1, 2011

Related U.S. Application Data (60) Provisional application No. 61/203,045, filed on Dec. 17, 2008.

(30) Foreign Application Priority Data

Dec. 17, 2008   (DK) .................................. 2008 01804

(51) Int. Cl.
*F16B 4/00*    (2006.01)
(52) U.S. Cl.
USPC ............ 403/273; 403/361; 403/202; 403/293
(58) Field of Classification Search
USPC ......... 403/202, 203, 292, 293, 341, 361, 273; 464/182
See application file for complete search history.

(56) References Cited

U.S. PATENT DOCUMENTS 3,167,338 A  *   1/1965  Troike ........................... 403/354
4,297,779 A  *  11/1981  Melton et al. .................... 29/446

(Continued)

FOREIGN PATENT DOCUMENTS

EP    0 460 292    12/1991
EP    1 457 673     9/2004

(Continued)

OTHER PUBLICATIONS

Lennart Bitsch; 1st Technical Examination and Search Report issued in priority Denmark Application No. PA 2008 01804; Jul. 16, 2009; 5 pages; Denmark Patent and Trademark Office.

(Continued)

*Primary Examiner* — Daniel P Stodola
*Assistant Examiner* — Jonathan Masinick
(74) *Attorney, Agent, or Firm* — Wood, Herron & Evans, LLP (57) ABSTRACT A connection for connecting shafts in a wind turbine includes a first shaft and a second shaft which are inter-connectable by connecting an interconnection part of the first shaft and an interconnection part of the second shaft, and a shrinkable disk positioned and adapted so as to lock the first shaft to the second shaft by providing pressure to the interconnection parts of the first and second shaft when the interconnection parts are interconnected, and where the interconnection part of each of the first and second shafts comprises a plurality of friction surfaces transferring moment between the first and second shafts by friction.

16 Claims, 7 Drawing Sheets

(56) References Cited

U.S. PATENT DOCUMENTS

| | | | |
|---|---|---|---|
| 4,715,739 A | 12/1987 | Riiegg et al. | |
| 5,253,947 A | 10/1993 | Petrzelka et al. | |
| 5,598,746 A * | 2/1997 | Chen | 74/606 R |
| 8,075,217 B2 * | 12/2011 | Eason | 403/109.1 |

FOREIGN PATENT DOCUMENTS

| | | |
|---|---|---|
| EP | 1 617 075 | 1/2006 |
| JP | 1-153808 | 6/1989 |
| WO | 96/11338 | 4/1996 |
| WO | 03/037608 | 5/2003 |
| WO | 2004/027260 | 4/2004 |

OTHER PUBLICATIONS

David Bradley; International Search Report and Written Opinion issued in priority International Application No. PCT/DK2009/050334; Dec. 7, 2010; 9 Pages; European Patent Office.

* cited by examiner

SHRINK DISK CONNECTION FOR A WIND TURBINE

FIELD OF THE INVENTION

The invention relates to a rigid shrink disk connection for a wind turbine. The connection is provided by inter-connectable members and a shrinkable disk.

BACKGROUND OF THE INVENTION

Wind turbines are used to gather wind energy and to transform the energy into another form of energy. For this purpose most wind turbines include a main shaft which in one end is coupled to blades of the wind turbine. The main shaft is in the opposite end normally connected to another shaft or shaft like member of the wind turbine. This other shaft may be a shaft such as an entrance shaft or member of a gearbox or an entrance shaft or torque transferring member of an electric energy generator.

In modern wind turbines, a torque which is to be transferred between the main shaft and another member or shaft is relatively high, such as lying in the interval between 3000 and 7500 kilo Newton meters.

Various solutions have been provided in wind turbines in order to transfer the torque and possibly also bending moments. Examples of disadvantages with some solutions are that it has proved difficult or time consuming to connect and lock the shafts to each other and possibly also difficult to separate the shafts from each other again. Other solutions have proven that they were not able to withstand the torque provided and yet some solutions have additionally or alternatively proven to be too expensive or relatively large when considering their overall effectiveness.

SUMMARY OF THE INVENTION

It may be seen as an object of the present invention to provide an improved wind turbine shaft connection, an improved method of connecting a first shaft with a second shaft in a wind turbine and a wind turbine including such a shaft connection. Preferably, the invention alleviates, mitigates or eliminates one or more of the above or other disadvantages singly or in any combination.

In particular, it may be seen as an object of the invention to provide a solution which is found to be able to withstand the torque and possibly also bending moments provided between a main shaft in a wind turbine and another shaft while still being relatively inexpensive and possibly also simple and effective to use.

Accordingly there is provided, in a first aspect, a wind turbine shaft connection, the connection comprising
a first shaft with a length in a longitudinal direction and a first shaft end with a radial extension, and
a second shaft with a length in the longitudinal direction and a second shaft end with a radial extension, the first shaft and the second shaft each comprising an interconnecting part and being inter-connectable by connecting an interconnection part of the first shaft and an interconnection part of the second shaft, and
a shrinkable disk being positioned and adapted so as to lock the first shaft to the second shaft by providing pressure to the interconnection parts of the first and second shaft when the interconnection parts are interconnected, and wherein the interconnection part of the first shaft comprises a plurality of friction surfaces for transferring moment between the first and second shafts by friction, and the interconnection part of the second shaft comprises a plurality of friction surfaces for transferring moment between the first and second shafts by friction, and hereby connecting the first shaft to the second shaft by shrinking the disk.

Thus, an improved wind turbine shaft connection is provided. When utilizing the shrinkable disk in conjunction with other parts of the shaft connection as described, a possible advantage may be that a solution is provided which is found to be able to withstand the torque of, for example, a main shaft of a modern wind turbine, while still being relative inexpensive, simple and effective to use.

The ability to withstand the relatively high torque, or a relatively high torque compared to a diameter of one or both of the shafts, may be a result of providing the plurality of friction surfaces as described. Furthermore, when providing a connection as described it is rather easy to connect and disconnect the shafts from each other. This may be due to the number of friction surfaces, to which the pressure is provided, being increased from a single to a plurality of surfaces. Hereby any amount of deformation of the surfaces which may provide difficulties when or if the shafts are disconnected from each other is possibly eliminated.

A further possible advantage when providing a connection as described herein may be that any additional parts adjacent to or connected to the first or second or both shafts may be provided with a size which may be decreased relative to other solutions.

Still further, a possible advantage of the described connection is that the described connection is also able to withstand bending moments of a size as provided in a wind turbine of today. This may be due to the manner in which the interconnection parts are provided and connected. A possible advantage by the connection as described is also that the connection is particularly suited for transferring reversing and/or alternating torques. It is to be understood that the plurality of friction surfaces are surfaces which transfers a load resulting from the torque or bending moment between the shafts or between a driving member and a driven member.

When the plurality of friction surfaces for at least one of the first and second shafts are extending in the longitudinal direction, a possible advantage may lie therein that surfaces which are possibly at least partly already present or easy to provide in the shafts are used.

When the plurality of friction surfaces for at least one of the first and second shafts are extending in an inner or outer circumferential direction of the shafts, a possible advantage may lie therein that surfaces which are possibly at least partly already present or easy to provide in the shafts are used.

When the plurality of friction surfaces for at least one of the first and second shafts are only extending in the longitudinal direction and in the inner or outer circumferential direction of the at least one shaft, a possible advantage may lie therein that only surfaces which are possibly at least partly already present or easy to provide in the shafts are used.

When the plurality of friction surfaces in at least one of the first and the second shaft comprises at least one groove in the shaft end for insertion of an interconnection part of another of the two inter-connectable shafts, a possible advantage may lie therein that a simple way of providing the friction surfaces is possibly given.

When the at least one groove is a circumferential groove, the groove may possibly be even simpler to provide and use. For the use part, this may lie therein that a circumferential groove not necessarily necessitate that any given rotational tolerances are needed between interconnection parts prior to their interconnection.

When at least one of the first and second shafts is hollow, a possible advantage is that at least one of the shafts may be used in accordance with the invention or embodiments of the invention without any additional refining of the at least one shaft.

When an inner and an outer radius of the at least one circumferential groove in the shaft end are substantially the same as an inner and outer radius of a corresponding circumferential interconnecting part in the other of the two interconnectable shafts, or a width in the radial direction of the at least one groove is substantially the same as a material thickness of a first shaft of the wind turbine, a possible advantage is that possibly very simple embodiments are provided.

When a depth in the longitudinal direction of the at least one groove is within one interval of the following group of intervals; 0.05-0.75 m., 0.15-0.60 m., 0.25-0.50 m., a depth is provided which is found to be adequate to obtain the transferral of rotational torque while also considering how to manufacture the groove and that the connection is possibly also used for transferring bending moments.

When the interconnection part of the first and the second shaft end comprises at least one groove in both the end of the first shaft and in the end of the second shaft, a possible advantage is that a solution which may transfer even higher torques is provided.

When one friction surface of the plurality of friction surfaces of the interconnection part of the second shaft is provided by the second shaft and another of the plurality of friction surfaces of the interconnection part of the second shaft is provided by a separate unit which is coupled to the second shaft by a shear-coupling, a possible advantage is that a solution which may be relatively simple to manufacture is possibly provided. The separate unit may comprise a unit coupleable to the second shaft on an interior surface or exterior surface of the second shaft. One or both of these solutions may advantageously be chosen, for example, in dependence of whether or not the second shaft is hollow or whether or not there is sufficient space on an exterior surface of the second shaft.

When one or more of the plurality of friction surfaces of the first or the second shaft is provided by a surface of the shrink disk, a possible advantage is that a surface which is already present in the connection is used.

When the shrink disk is rigidly connected to one of the first or the second shaft by a shear coupling, a feasible connection of these parts is provided.

When the plurality of friction surfaces of the interconnection part of the first shaft or of the second shaft are provided by surfaces of a monolithic interconnection part of the first or the second shaft respectively, a possible advantage is that the first or second or both shafts may be prefabricated to be used in accordance with the invention or embodiments of the invention, for example, not needing to be assembled of various pieces before interconnecting the shafts.

In accordance with a second aspect of the invention there is provided a wind turbine including a wind turbine shaft connection as described herein.

In accordance with a further aspect of the invention there is provided a method of connecting a first shaft with a second shaft in or rather for a wind turbine, the method being provided for shafts of a wind turbine, the wind turbine comprising a first and a second inter-connectable shafts, the first shaft having a length in a longitudinal direction and a first shaft end with a radial extension, and the second shaft having a length in a longitudinal direction and a second shaft end with a radial extension, the method comprising overlapping an interconnection part of the first and the second shafts in the longitudinal direction, the interconnection part of the first shaft comprising a plurality of friction surfaces for transferring moment between the first and second shafts by friction, and the interconnection part of the second shaft comprising a plurality of friction surfaces for transferring moment between the first and second shafts by friction, and positioning a shrinkable disk so as to be able to lock the first shaft to the second shaft by providing a pressure to the plurality of friction surfaces of the first and second shafts, and connecting the first shaft to the second shaft by shrinking the disk and hereby providing the pressure.

Thus an improved method of interconnecting two shafts or shaft like members with each other in a wind turbine is provided. Connecting the shafts may be provided in the wind turbine, such as in a nacelle of the wind turbine, but may off course alternatively be provided or carried out anywhere else.

When furthermore providing the overlapping of the interconnection part of the first and the second shaft in the longitudinal direction by inserting the interconnection part of at least one of the shafts in at least one groove of the other shaft, a possible advantage is that a simple manner of interconnecting the shafts or torque transferring members is provided.

It must be understood that any advantage mentioned may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
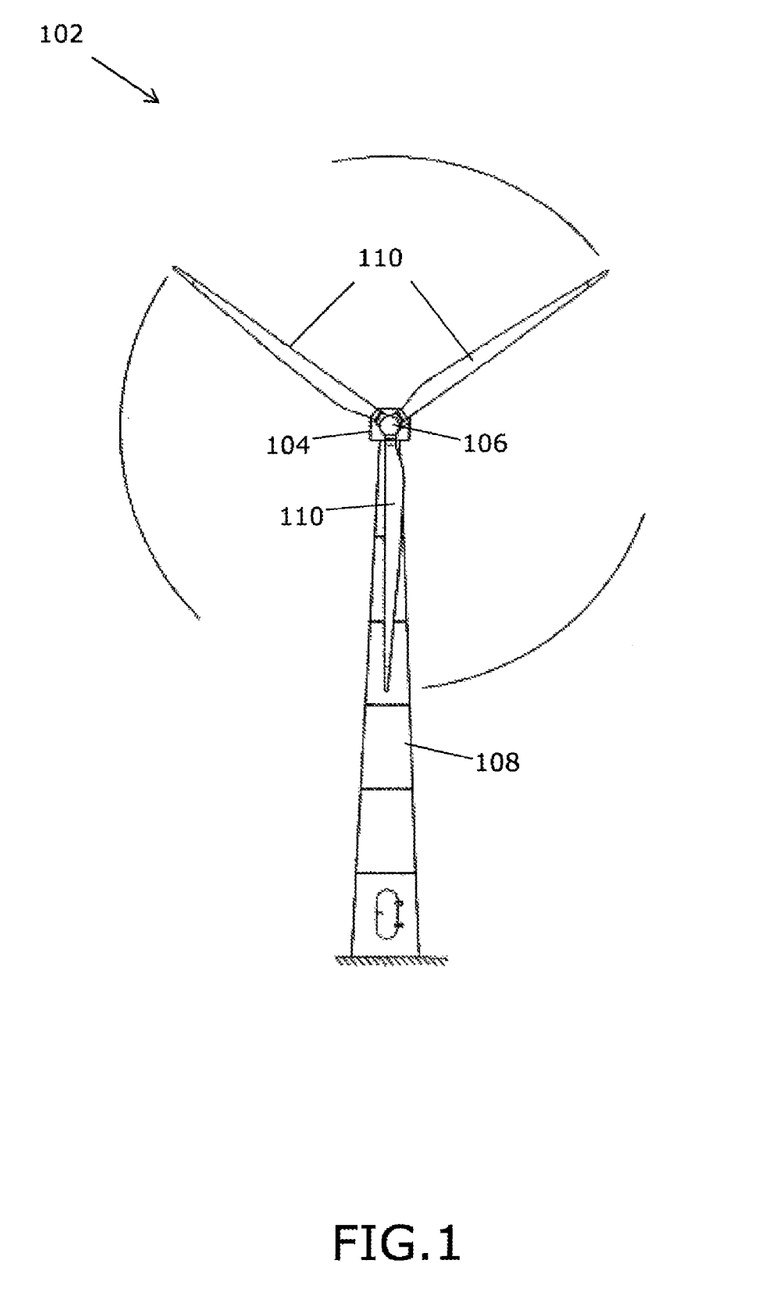
FIG. 1 shows a wind turbine.

FIG. 1 shows a wind turbine 102 with a nacelle 104, and a hub 106 rotatably mounted to the nacelle 104 via a first shaft. In this example the first shaft is the main shaft of the wind turbine (not shown in FIG. 1). The nacelle 104 is rotatable mounted on a wind turbine tower 108. The hub 106 of the wind turbine includes three wind turbine blades 110 which rotate around a first shaft centre axis of the wind turbine in a rotational plane substantially perpendicular to the first shaft centre axis.

Figure 2:
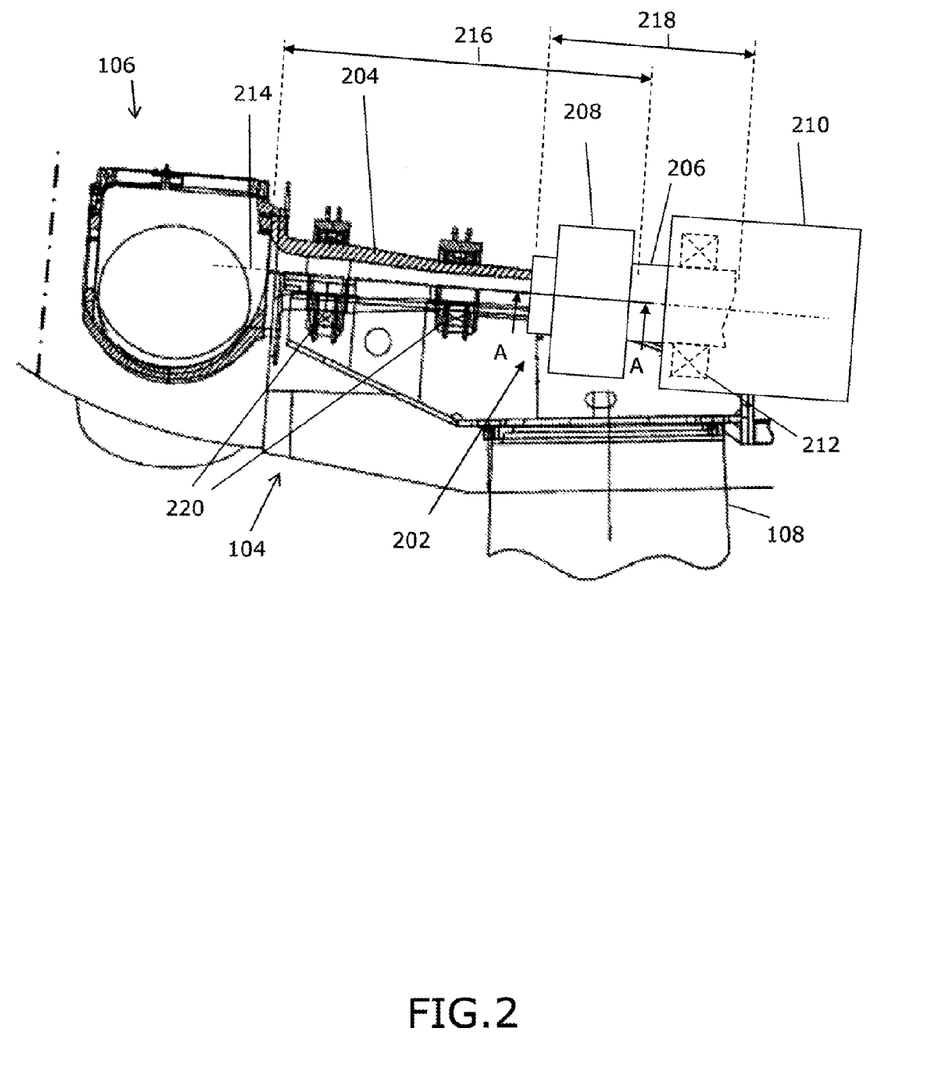
FIG. 2 is a side view of a hub and a nacelle of the wind turbine.

FIG. 2 is a side view of the hub 106 and the nacelle 104. Some parts, such as the first shaft 204, comprised in the hub and in the nacelle are shown in a cross-sectional view. The figure shows the first shaft centre axis 214 running in a longitudinal direction in a centre of the first shaft 204.

In particular, the figure shows a connection 202 for or in a wind turbine, with a first shaft 204 with a length 216 in a longitudinal direction and a first shaft end with a radial extension, and a second shaft 206 with a length 218 in the longitudinal direction and a second shaft end with a radial extension. In this example the first shaft is a main shaft of the wind turbine and the second shaft is an entrance shaft or entrance member of a gearbox 210 or an entrance shaft, or entrance member, directly into a generator. The first and the second shafts are inter-connectable by connecting an interconnection part of the first shaft 204 and an interconnection part of the second shaft 206. In the shown embodiment a shrinkable disk 208, surrounding the shafts, is positioned and adapted so as to lock and connect the first shaft to the second shaft by providing pressure to the interconnection parts of the first and second shaft. It is possible to unlock the shaft connection and unlocking comprises releasing the pressure provided by the shrinkable disk 208.

The first shaft 204 may be referred to as a driving member and the second shaft 206 may be referred to as a driven member.

A purpose of the connection is to provide a rigid connection to transfer a high torque between the two shafts or members 204, 206. The torque is among others resulting from a force provided by the wind to the blades and via the first shaft 204. The torque also results from resistance provided by a system for generating energy coupled to the second shaft or shaft like driven member 206. The connection may also be provided for transferral of, for example, bending moments.

The figure also illustrates bearings 220 provided for bearing the main shaft 204 and transferring bending moments from the main shaft to the tower 108. In the shown embodiment two bearings 220 are shown, but only one of these bearings, such as a front most of these two bearings, may be provided and a bearing 212 may also be used for transferring bending moments to the tower. The bearing 212 is in the shown example primarily provided for bearing the second shaft 206. In the shown example the bearing 212 for the second shaft is provided in connection with the gearbox 210. It follows from the figure that the size of the bearings 212, 220 and supporting structures for the bearings, such as the gearbox, is provided so as to follow the size or diameter of the first or second shafts. Still further any other components, such as gear wheels (not shown) and the like, possibly coupled to the first or the second shaft, follows, at least to some extent, the size or diameter of the first or the second shaft.

Figure 3:
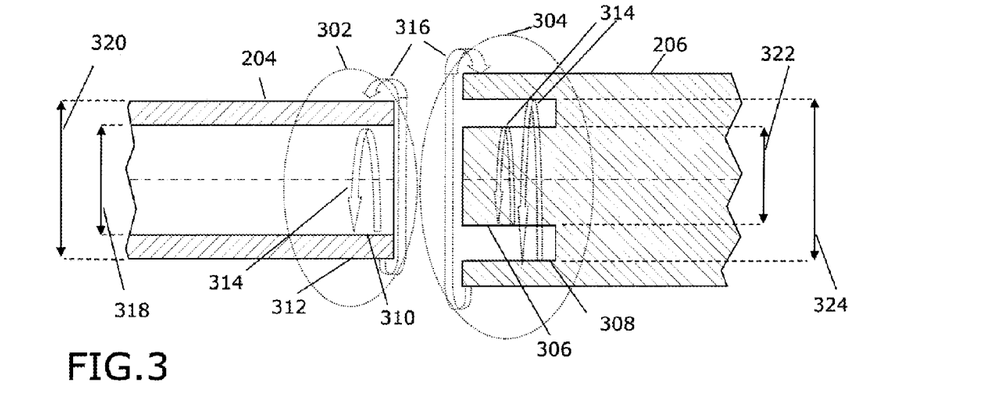
FIG. 3 is a drawing showing a cross-section of shafts prior to inter-connecting.

FIG. 3 is a drawing showing a cross-section of the shafts 204, 206 prior to inter-connecting the first shaft 204 and the second shaft 206. The figure shows that the interconnection part 302 in one end of the first shaft 204 comprises a plurality of friction surfaces 310, 312 for transferring moment between the first and second shafts.

Figure 4:
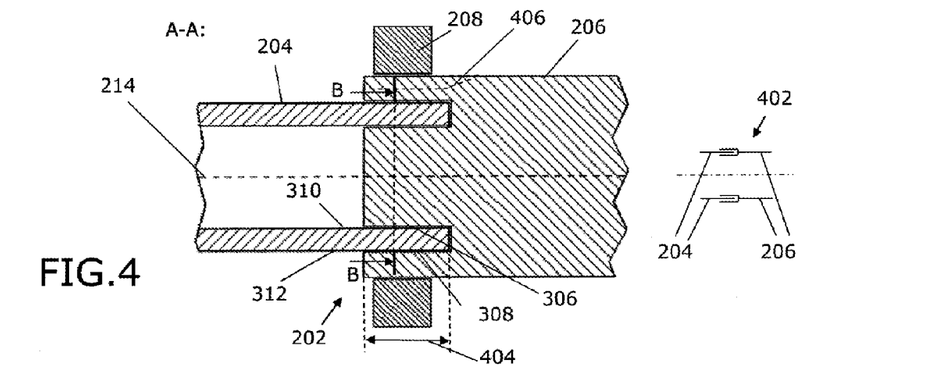
FIG. 4 shows a connection for connecting shafts in a wind turbine in the cross-section A-A indicated on FIG. 2.

FIGS. 3 and 4 also shows that the interconnection part 304 in one end of the second shaft 206 comprises a plurality of friction surfaces 306, 308 for transferring moment between the first and second shafts.

FIG. 4 shows the cross-section A-A indicated on FIG. 2. The figure shows the first and the second shaft when interconnected with each other by inserting the interconnection part 302 of the first shaft 204 in a groove (shown in front view in FIG. 5) of the second shaft 206. The groove in the second shaft is the interconnection part of the second shaft 206. On the right hand side of FIG. 4 there is shown a simplified illustration 402 of the connection 202. The illustration 402 shows that the second shaft 206 comprises a groove as explained in which the first shaft 204 is inserted.

It can be seen from FIGS. 3 and 4 that the plurality of friction surfaces 310, 312 in only a single end of one of the first or second shafts is extending in the longitudinal direction. Furthermore it follows from the shown embodiment of the first and second shaft that the plurality of friction surfaces 310, 312 of a single end of the first shaft and the plurality of friction surfaces of a single end of the second shaft 306, 308 is extending in an inner or outer circumferential direction. In the shown embodiment the plurality of friction surfaces for both of the first and the second shaft is only extending in the longitudinal direction and in the inner or outer circumferential direction of the shafts. It also follows from FIGS. 3 and 4 that the first shaft 204 is a hollow shaft.

In the shown example it can be seen that an inner and an outer radius 322, 324 of the circumferential groove in the second shaft end are substantially the same as an inner and outer radius 318, 320 of a corresponding circumferential interconnecting part 302 in the first shaft of the two interconnectable shafts 206 and 204. I.e., a width in the radial direction of the groove is substantially the same as a material thickness of the first shaft 204 of the wind turbine.

FIG. 4 also shows a depth in the longitudinal direction of the groove which is in within an interval of approximately 0.25-0.50 m. In the shown example the outer radius 320 of the first shaft 204 is within an interval of approximately 0.75-1.5 m. FIG. 4 shows, in connection with FIG. 5, that the second shaft 206 has at least one and possibly a plurality of longitudinal slots 406. The slots have a length in the longitudinal direction similar to the groove 502, and a possible advantage of the at least one slot is that insertion of the first shaft into the second shaft with at least one slot may be easier than an insertion into a shaft without at least one slot.

Figure 5:
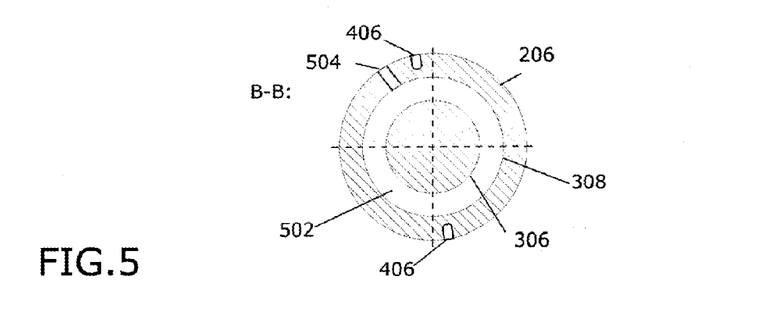
FIG. 5 shows the cross-section B-B indicated in FIG. 4.

FIG. 5 shows the cross-section B-B indicated in FIG. 4, though the first shaft 204 is not shown. The figure illustrates that the plurality of friction surfaces in the second shaft 206 includes one circumferential groove 502 in the longitudinal direction of the shaft into the radial extension of the shaft end. The groove 502 is provided for insertion of the interconnection part 302 of the first shaft 204. The figure also shows that two slot 406 with a depth in the radial direction which is only approximately 60-95% through a material thickness of the shaft are provided. The slots may alternatively be provided all through the material thickness of the shaft as illustrated with the slit or slot 504 or there may be provided both types of slots.

Figure 6:
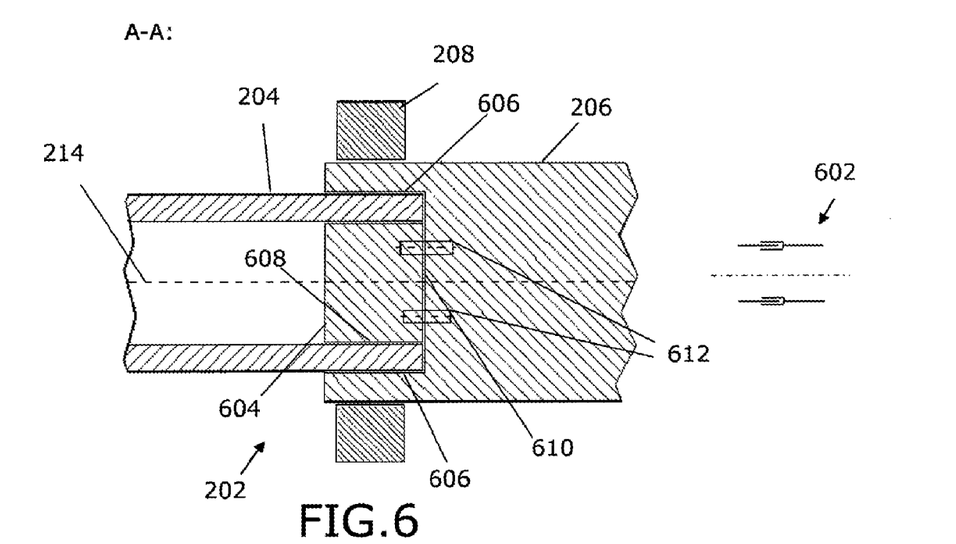
FIG. 6 shows a connection for connecting shafts in a wind turbine.

FIG. 6 shows a connection 202 where one friction surface 606 of the interconnection part of the second shaft 206 is provided by the second shaft 206 and another 608 of the plurality of friction surfaces of the interconnection part of the second shaft 206 is provided by a separate unit 604 which is coupled to the second shaft by a shear-coupling. In the shown example the shear-coupling comprises a plurality of pins 612 inserted into and hereby coupling aligned holes in the separate unit and in the second shaft. The separate unit may as shown in FIG. 6 by coupled to the second shaft on an interior surface 610 of the second shaft.

Figure 7:
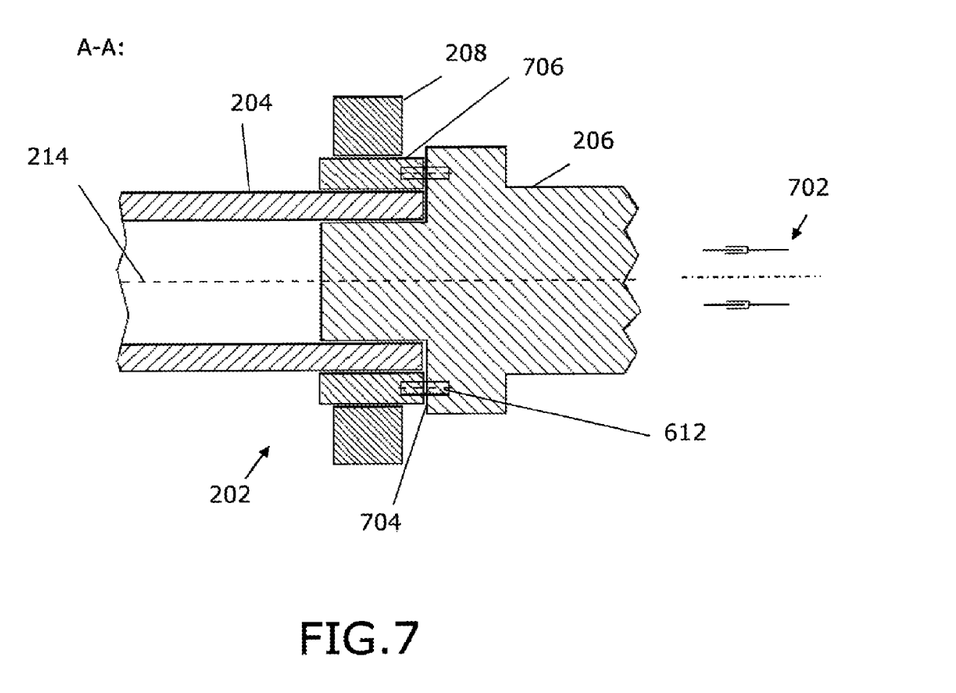
FIG. 7 shows a connection for connecting shafts in a wind turbine.
Figure 8:
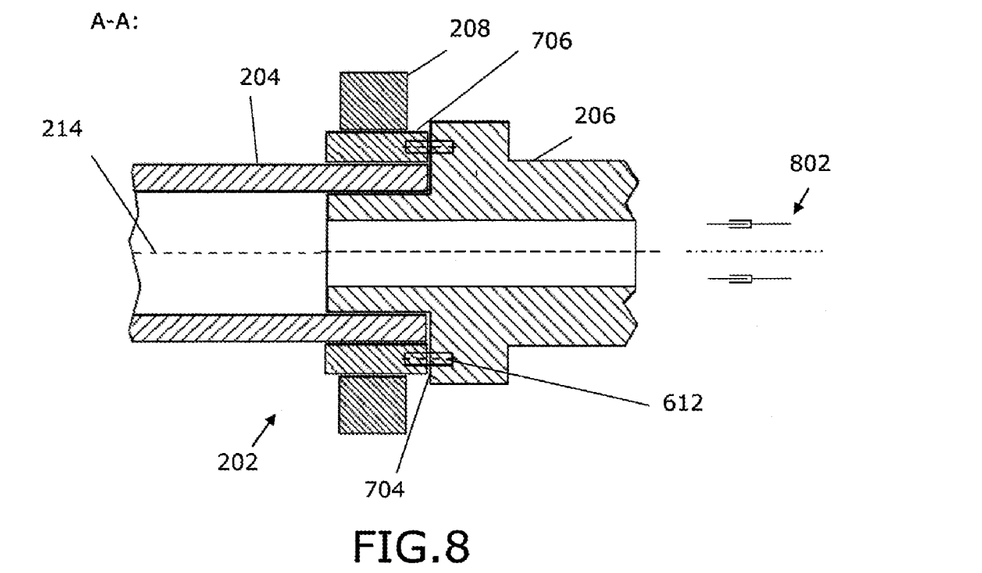
FIG. 8 shows a connection for connecting shafts in a wind turbine.

On the right hand side of FIG. 6-8 there is shown a simplified illustration 602, 702 and 802 which are all the same as the illustration 402 shown in FIG. 4. The simplified illustrations show that the connection 202, when simplified, is similar for the FIGS. 4, 6, 7 and 8.

FIG. 7 shows a connection where a separate unit 706 is coupled to the exterior surface 704 of the second shaft. In the shown embodiment the separate unit is a cylindrical ring.

FIG. 8 shows a connection similar to the one in FIG. 7, but where the second shaft 206 is hollow. A possible advantage hereby is that this provides a second shaft which is easier to produce by a casting process.

Figure 9:
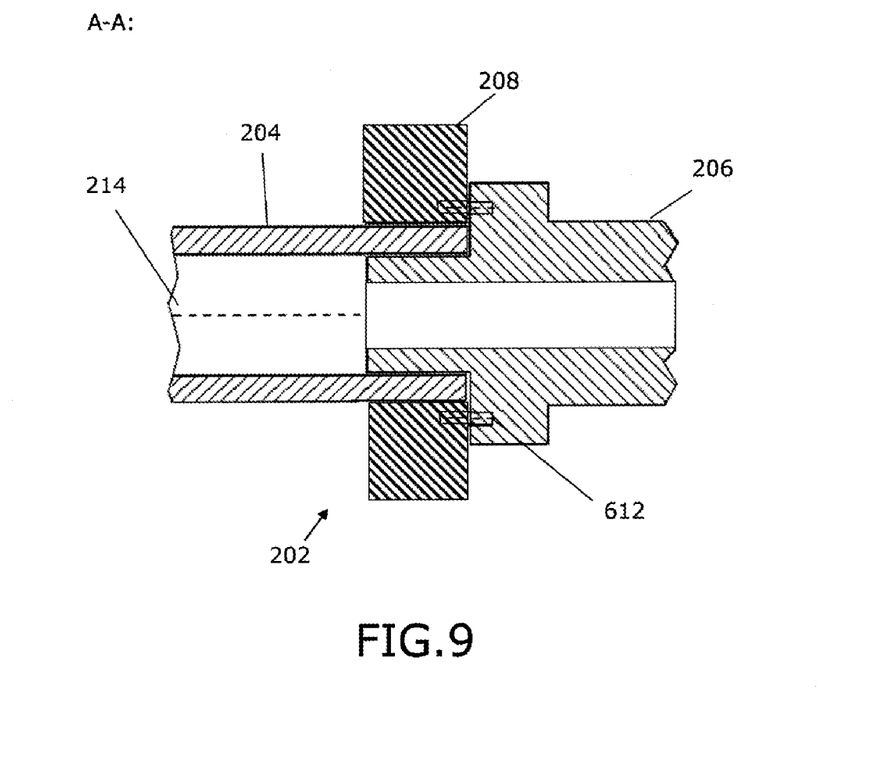
FIG. 9 illustrates a connection for connecting shafts in a wind turbine.

FIG. 9 shows a connection 202 where the shrink disk 208 is connected to the second shaft 206 via a shear coupling. In the shown embodiment the shear coupling is provided by pins 612 inserted into the shrink disk and into the second shaft. The figure shows that a connection is provided where one of the plurality of friction surfaces of the second shaft is provided by a surface of the shrink disk 208. The figure also shows that the shrink disk 208 is rigidly, though preferably releasable, connected and fixed to the second shaft 206 by the pins 612. Other shear coupling principles for coupling the shrink disk to the shaft may be used such as bolts connected to (members of—not shown) the shrink disk 208. A possible advantage by using a surface of the shrink disc, such as a shrinkable surface of the shrink disk, as one of the plurality of friction surfaces is that a surface which is already present is used.

Figure 10:
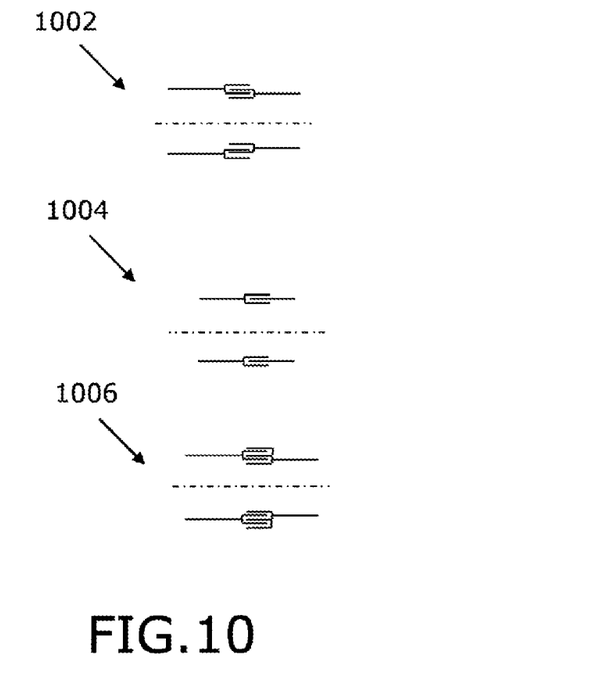
FIG. 10 illustrates alternative connections.

FIG. 10 illustrates, in a simplified way 1004, that it may be the first shaft which has the interconnection part with the plurality of friction surfaces provided by the groove. Alternatively, it may as an example, be both shafts which has a groove as an interconnection part in the radial part of the shaft end. This is illustrated in a simplified way in the illustration 1002. Similarly, as illustrated at 1006, if further friction surfaces are required the interconnection parts of both the first and second shafts may each comprise, for example, four friction surfaces.

Figure 11:
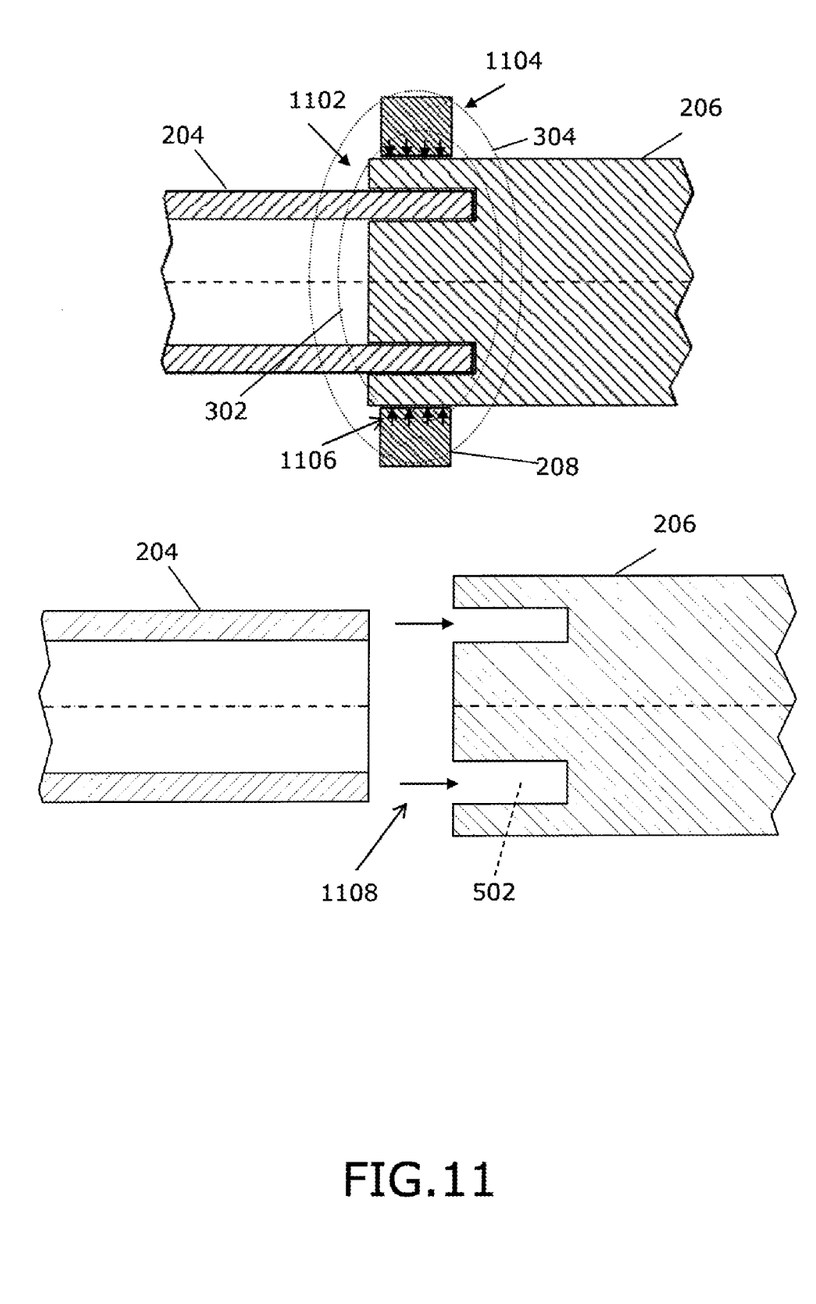
FIG. 11 illustrates a method in accordance with embodiments of the invention.

FIG. 11 illustrates a method of connecting a first shaft with a second shaft in a wind turbine, the wind turbine including a first and a second inter-connectable shafts, the first shaft having a length in a longitudinal direction and a first shaft end with a radial extension, and the second shaft having a length in a longitudinal direction and a second shaft end with a radial extension, the method including overlapping 1102 an interconnection part 302, 304 of the first and the second shaft 204, 206 in the longitudinal direction, the interconnection part of each of the first and second shaft comprising a plurality of friction surfaces for transferring moment between the first and second shafts, and positioning 1104 a shrinkable disk 208 so as to be able to lock the first shaft 204 to the second shaft 206 by providing a pressure to the plurality of friction surfaces of the first and second shafts, and connecting the first shaft to the second shaft by shrinking the disk and hereby providing the pressure 1106.

The figure also illustrates that overlapping an interconnection part of the first and the second shaft in the longitudinal direction may include inserting the interconnection part 302 of at least one of the shafts in at least one groove 502, which forms another interconnecting part 304 of the other shaft. (Only the cross-section of the groove is shown).

In accordance with a possible aspect of the invention there is provided a connection of a driving member and a driven member, the connection comprising a driving member with a length in a longitudinal direction and a first driving member end with a radial extension, and a driven member with a length in the longitudinal direction and a driven member end with a radial extension, the driving member and the driven member being inter-connectable by connecting an interconnection part of the driving member and an interconnection part of the driven member, and a shrinkable disk being positioned and adapted so as to lock the driving member to the driven member by providing pressure to the interconnection parts of the members when the interconnection parts are interconnected, and wherein the interconnection part of the driving member comprises a plurality of friction surfaces for transferring moment between the driving member and the driven member by a friction coupling, and the interconnection part of the driven member comprises a plurality of friction surfaces for transferring moment between the driving member and the driven member by a friction coupling, and connecting the driving member to the driven member by shrinking the disk.

This aspect may among other be provided in order to seek protection for the connection as such. Furthermore this aspect seeks protection for a connection using the wording 'a driving member and a driven member' as an alternative to 'a first and a second shaft'. This may especially be relevant for the driven member, which may be a shaft or a shaft like structure, but which may alternatively be a driven member such as an entrance member in a gearbox or a generator.

In short, it is herein described that in order, for example, to provide a connection for connecting shafts in a wind turbine which is able to withstand the torque of a modern wind turbine, while still being relatively inexpensive, simple and effective to use, there is disclosed a connection including a first shaft and a second shaft which are inter-connectable by connecting an interconnection part of the first shaft and an interconnection part of the second shaft, and a shrinkable disk positioned and adapted so as to lock the first shaft to the second shaft by providing pressure to the interconnection parts of the first and second shaft when the interconnection parts are interconnected, and where the interconnection part of each of the first and second shafts comprises a plurality of friction surfaces transferring moment between the first and second shafts by friction.

Although the present invention has been described in connection with preferred embodiments it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality.

The invention claimed is:

1. A wind turbine shaft connection, comprising:
a first wind turbine shaft with a length in a longitudinal direction and a first shaft end with a radial extension,
a second wind turbine shaft with a length in the longitudinal direction and a second shaft end with a radial extension, the first shaft and the second shaft each comprising an interconnection part and being inter-connectable by connecting the interconnection part of the first shaft and the interconnection part of the second shaft, and
at least one longitudinal slot provided on an external surface of the second shaft, the longitudinal slot having a length in the longitudinal direction and a depth in a radial direction of the second shaft, and
a shrinkable disk being positioned outwardly about the interconnection parts of the first and second shaft and on the external surface of the second shaft on which the at least one longitudinal slot is provided such that the shrinkable disk at least partially overlies the at least one longitudinal slot, the shrinkable disk being adapted to provide an inwardly directed force so as to lock the first shaft to the second shaft by providing pressure to the interconnection parts of the first and second shaft when the interconnection parts are interconnected,
wherein the interconnection part of the first shaft comprises a plurality of friction surfaces for transferring moment between the first and second shafts by friction, and the interconnection part of the second shaft comprises a plurality of friction surfaces for transferring moment between the first and second shafts by friction, and hereby connecting the first shaft to the second shaft by shrinking the disk, and
wherein the plurality of friction surfaces in the second shaft comprises at least one circumferential groove in the shaft end for insertion of the interconnection part of the first shaft, wherein an inner and an outer radius of the at least one circumferential groove in the shaft end are substantially the same as an inner and outer radius of a corresponding circumferential interconnection part in the first shaft.

2. The connection according to claim 1, wherein the plurality of friction surfaces for at least one of the first and second shafts are extending in the longitudinal direction.

3. The connection according to claim 2, wherein the plurality of friction surfaces for at least one of the first and second shafts are extending in an inner or outer circumferential direction of the shafts.

4. The connection according to claim 3, wherein the plurality of friction surfaces for at least one of the first and second shafts are only extending in the longitudinal direction and in the inner or outer circumferential direction of the at least one shaft.

5. The connection according to claim 1, wherein at least one of the first and second shafts are hollow.

6. The connection according to claim 1, wherein a depth in the longitudinal direction of the at least one circumferential groove is within one interval of the following group of intervals; 0.05-0.75 m., 0.15-0.60 m., 0.25-0.50 m.

7. The connection according to claim 1, wherein the interconnection part of the first and the second shaft end comprises at least one groove in both the end of the first shaft and in the end of the second shaft.

8. The connection according to claim 1, wherein the interconnection part of the second shaft includes a separate unit that forms a portion of the at least one circumferential groove.

9. The connection according to claim 8, wherein the separate unit comprises a unit adjacent to an interior surface of the second shaft.

10. The connection according to claim 1, wherein the plurality of friction surfaces of the interconnection part of the first shaft or of the second shaft are provided by surfaces of a monolithic interconnection part of the first or the second shaft respectively.

11. The connection according to claim 1, wherein one of the shafts is a main shaft of a wind turbine.

12. The wind turbine shaft connection of claim 1, wherein the at least one longitudinal slot extends radially inward into the at least one circumferential groove.

13. A wind turbine, comprising:
a tower;
a nacelle coupled to the tower;
a hub mounted to the nacelle and including at least one blade; and
a wind turbine shaft connection, the connection comprising:
a first wind turbine shaft with a length in a longitudinal direction and a first shaft end with a radial extension;
a second wind turbine shaft with a length in the longitudinal direction and a second shaft end with a radial extension, the first shaft and the second shaft each comprising an interconnection part and being inter-connectable by connecting the interconnection part of the first shaft and the interconnection part of the second shaft; and
at least one longitudinal slot provided on an external surface of the second shaft, the longitudinal slot having a length in the longitudinal direction and a depth in a radial direction of the second shaft, and
a shrinkable disk being positioned outwardly about the interconnection parts of the first and second shaft and on the external surface of the second shaft on which the at least one longitudinal slot is provided such that the shrinkable disk at least partially overlies the at least one longitudinal slot, the shrinkable disk being adapted to provide an inwardly directed force so as to lock the first shaft to the second shaft by providing pressure to the interconnection parts of the first and second shaft when the interconnection parts are interconnected,
wherein the interconnection part of the first shaft comprises a plurality of friction surfaces for transferring moment between the first and second shafts by friction, and the interconnection part of the second shaft comprises a plurality of friction surfaces for transferring moment between the first and second shafts by friction, and hereby connecting the first shaft to the second shaft by shrinking the disk, and
wherein the plurality of friction surfaces in the second shaft comprises at least one circumferential groove in the shaft end for insertion of the interconnection part of the first shaft, wherein an inner and an outer radius of the at least one circumferential groove in the shaft end are substantially the same as an inner and outer radius of a corresponding circumferential interconnection part in the first shaft.

14. The wind turbine of claim 13, wherein the at least one longitudinal slot extends radially inward into the at least one circumferential groove.

15. A wind turbine shaft connection, comprising:
a first wind turbine shaft extending in a longitudinal direction and including a first shaft end with a radial extension, a second wind turbine shaft extending in the longitudinal direction and including a second shaft end with a radial extension, the first shaft and the second shaft each comprising an interconnection part, and at least one longitudinal slot provided on an external surface of the second shaft, the longitudinal slot having a length in the longitudinal direction and a depth in a radial direction of the second shaft, and a shrinkable disk being positioned outwardly about the interconnection parts of the first and second shaft and on the external surface of the second shaft on which the at least one longitudinal slot is provided such that the shrinkable disk at least partially overlies the at least one longitudinal slot, the shrinkable disk being adapted to provide an inwardly directed force so as to lock the first shaft to the second shaft by providing pressure to the interconnection parts of the first and second shaft when the interconnection parts are interconnected, wherein the interconnection part of the first shaft comprises at least one friction surface for transferring moment between the first and second shafts by friction, and the interconnection part of the second shaft comprises at least one friction surface for transferring moment between the first and second shafts by friction, and hereby connecting the first shaft to the second shaft by shrinking the disk, and wherein the at least one friction surface of the second shaft comprises at least one circumferential groove in the second shaft end for insertion of the interconnection part of the first shaft, wherein an inner and an outer radius of the at least one circumferential groove in the second shaft end are substantially the same as an inner and outer radius of a corresponding circumferential interconnection part in the first shaft.

16. The wind turbine shaft connection of claim 15, wherein the at least one longitudinal slot extends radially inward into the at least one circumferential groove.

\* \* \* \* \*